US007958351B2

(12) United States Patent
Luthi

(10) Patent No.: US 7,958,351 B2
(45) Date of Patent: Jun. 7, 2011

(54) METHOD AND APPARATUS FOR MULTI-LEVEL SECURITY IMPLEMENTATION

(75) Inventor: Peter O. Luthi, Nashua, NH (US)

(73) Assignee: Wisterium Development LLC, Wilmington, DE (US)

( * ) Notice: Subject to any disclaimer, the term of this patent is extended or adjusted under 35 U.S.C. 154(b) by 1008 days.

(21) Appl. No.: 10/334,318

(22) Filed: Dec. 31, 2002

(65) Prior Publication Data

US 2004/0044902 A1    Mar. 4, 2004

Related U.S. Application Data

(60) Provisional application No. 60/406,758, filed on Aug. 29, 2002.

(51) Int. Cl.
| | |
|---|---|
| *H04L 29/06* | (2006.01) |
| *G06F 21/00* | (2006.01) |
| *H04L 9/00* | (2006.01) |
| *H04L 9/08* | (2006.01) |
| *H04N 7/16* | (2011.01) |

(52) U.S. Cl. ........ 713/166; 713/186; 380/264; 380/286; 726/27; 726/28

(58) Field of Classification Search ................. 713/166, 713/189; 726/26–27; 380/264, 286
See application file for complete search history.

(56) References Cited

U.S. PATENT DOCUMENTS

| | | | |
|---|---|---|---|
| 4,328,542 A | 5/1982 | Anastas et al. | |
| 5,504,814 A | 4/1996 | Miyahara | |
| 5,530,758 A | 6/1996 | Marino, Jr. et al. | |
| 5,692,124 A * | 11/1997 | Holden et al. | 726/2 |
| 6,041,035 A * | 3/2000 | Thedens | 370/217 |
| 6,044,349 A * | 3/2000 | Tolopka et al. | 705/1 |
| 6,098,133 A * | 8/2000 | Summers et al. | 710/107 |
| 6,216,196 B1* | 4/2001 | Elwell et al. | 710/240 |
| 6,272,639 B1* | 8/2001 | Holden et al. | 726/12 |
| 6,304,973 B1* | 10/2001 | Williams | 726/3 |
| 6,308,080 B1* | 10/2001 | Burt et al. | 455/522 |
| 6,597,692 B1 | 7/2003 | Venkitakrishnan | |
| 6,836,847 B1* | 12/2004 | Zinger et al. | 726/19 |
| 6,868,309 B1* | 3/2005 | Begelman | 700/273 |
| 6,973,544 B2 | 12/2005 | Berg et al. | |
| 7,020,753 B2* | 3/2006 | Shanahan et al. | 711/147 |
| 7,043,596 B2* | 5/2006 | McWilliams et al. | 710/317 |
| 7,137,011 B1* | 11/2006 | Harari et al. | 713/189 |
| 7,178,033 B1* | 2/2007 | Garcia | 713/184 |
| 7,213,023 B2 | 5/2007 | Hadzikadic et al. | |
| 7,343,622 B1 | 3/2008 | Woodall | |
| 2002/0174369 A1* | 11/2002 | Miyazaki et al. | 713/202 |
| 2003/0131213 A1* | 7/2003 | Shanahan et al. | 711/203 |
| 2003/0200345 A1* | 10/2003 | Ramsey et al. | 709/253 |
| 2004/0052372 A1* | 3/2004 | Jakoubek | 380/255 |

OTHER PUBLICATIONS

PCT International Search Report dated Nov. 8, 2004 of International Application No. PCT/US03/27354 filed Aug. 29, 2003.

* cited by examiner

*Primary Examiner* — Kaveh Abrishamkar
*Assistant Examiner* — Trang Doan
(74) *Attorney, Agent, or Firm* — Fitch Even Tabin & Flannery

(57) ABSTRACT

A method of operating a multi-level security system including the steps of providing a plurality of processors. At least some of said processors are equipped with a data card which permits simultaneous processing of different classification levels of information and the dynamic reallocation of processors to different classification levels.

20 Claims, 7 Drawing Sheets

METHOD AND APPARATUS FOR MULTI-LEVEL SECURITY IMPLEMENTATION

CROSS REFERENCE TO RELATED APPLICATION

This application claims rights under U.S. Provisional Patent Application Ser. No. 60/406,758 filed Aug. 29, 2002.

BACKGROUND OF THE INVENTION

1. Field of the Invention

The present invention relates to signal and data processing, and in particular to methods and apparatus for granting privileged access to data and files by direct or indirect means. Still more particularly, the present invention relates to methods and apparatus for dynamically and automatically changing the classification level of processing elements.

2. Brief Description of Prior Developments

A multi-level security system is a system, which is capable of processing unclassified data, CONFIDENTIAL data, SECRET data, TOP SECRET data all in the same system. The conventional way that this function has been carried out is to physically separate processors. Some processors are dedicated to processing unclassified information while other processors are dedicated to processing SECRET information and still other processors are dedicated to processing TOP SECRET information. A possible problem with the above described approach is that at any instant in time the system may have much more unclassified information to process than classified information. The system may not, therefore, have enough processors to run the unclassified information, while other processors dedicated to classified information may be relatively underused.

Multi-level security has been implemented before in large networks and in systems that are custom designed but have not been implemented using commercial off the shelf processor boards in an embedded processing system.

A need therefore exists for a multi-level security system which efficiently makes use of all available computer assets. A need also exists for a multi-level security system which is capable of making use of off the shelf or other computers which may be readily available through commercial sources.

SUMMARY OF INVENTION

The present invention is a small data card that fits on top of the board which allows the security level of the processor to be dynamically changed by changing the keying information in the data card. This data card is called the virtual private network (VPN) card and it serves to implement the multi-level security system.

The data card which is included in the apparatus and method of the invention along with appropriate software that is an interface to a data fabric. The particular data fabric that we are pursuing currently is gigabit Ethernet although any data fabric would apply to this invention. The data fabric comes over the top of the circuit card, comes into the data card and goes into a government approved encryption device. The encryption device itself is conventional and well known to those skilled in the are and is available from various vendors and these are approved for use on encrypting classified information. Information is decrypted when it comes on to the board and encrypted when it comes off the board. This data card is always used in sets of cards and the basic concept is that when classified information at for example, the SECRET level needs to be transferred from one board to another board at the SECRET level that goes through the data card becomes encrypted and is put on the data fabric encrypted so that it is no longer classified information. It is then transferred over to the circuit card and it is decrypted and then sent to the commercial processing board where it is processed. Only cards that have the same key can process the SECRET information. The user has another circuit card with the VPN processing data at, for example, the CONFIDENTIAL level. Any attempt to send information from a SECRET module to a CONFIDENTIAL module will not succeed. The module will have a different key and that information will not be properly decrypted so it will not be received by the CONFIDENTIAL processing module. The user or controlling software then is provided a means to change the classification level of a processing card without any physical changes. For example, if a CONFIDENTIAL card wants to or needs to be changed or reallocated to SECRET processing, the trusted system software will zeroize the circuit card, clearing all the information of it, give it the SECRET level key and now that processor, which used to process CONFIDENTIAL information, is now capable of processing SECRET information. The VPN card provides the physical red/black boundary, making it possible to use commercial boards for classified processing, the unclassified information (black side) being the data fabric and the classified information (red side) being on the circuit card is on the data card. The user does not have to have any red/black boundaries on the commercial circuit card. The VPN card satisfies the requirements imposed by the government to implement the red/black boundary, some of those include tempest and encryption and these are all concentrated on to the small data card so that the user does not have to design the entire circuit card to the government specifications.

For purpose of this disclosure, the term "red" refers to all types of classified information generally and the term "black" refers to unclassified information. As used hereafter "pink", "purple" and "orange" are classes of "red".

BRIEF DESCRIPTION OF THE DRAWINGS

The present invention is further described with reference to the accompanying drawings in which:

FIG. 1b is a schematic diagram showing the operation of the COTS processor and VPN encryptor shown in FIG. 1a;

DETAILED DESCRIPTION OF THE PREFERRED EMBODIMENT

Figure 1A:
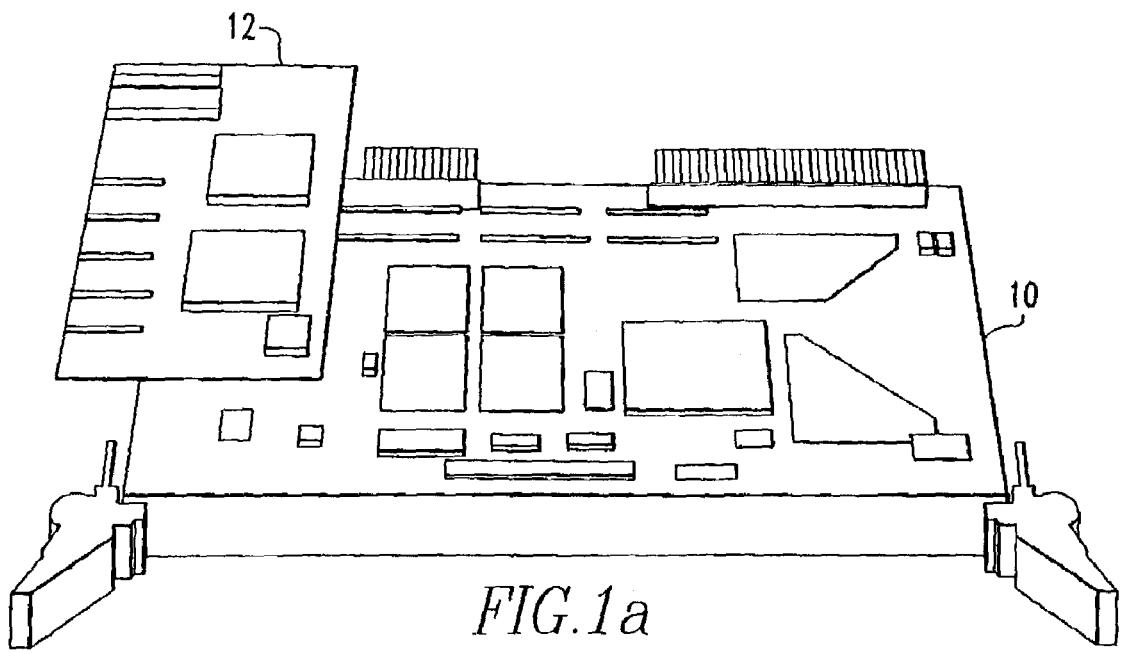
FIG. 1a is a front perspective view of a commercial off the shelf (COTS) processor board with a virtual private network (VPN) encryptor peripheral component interconnect mezzanine card (PMC) daughter card which comprises a preferred embodiment of the method of the present invention.
Figure 1B:
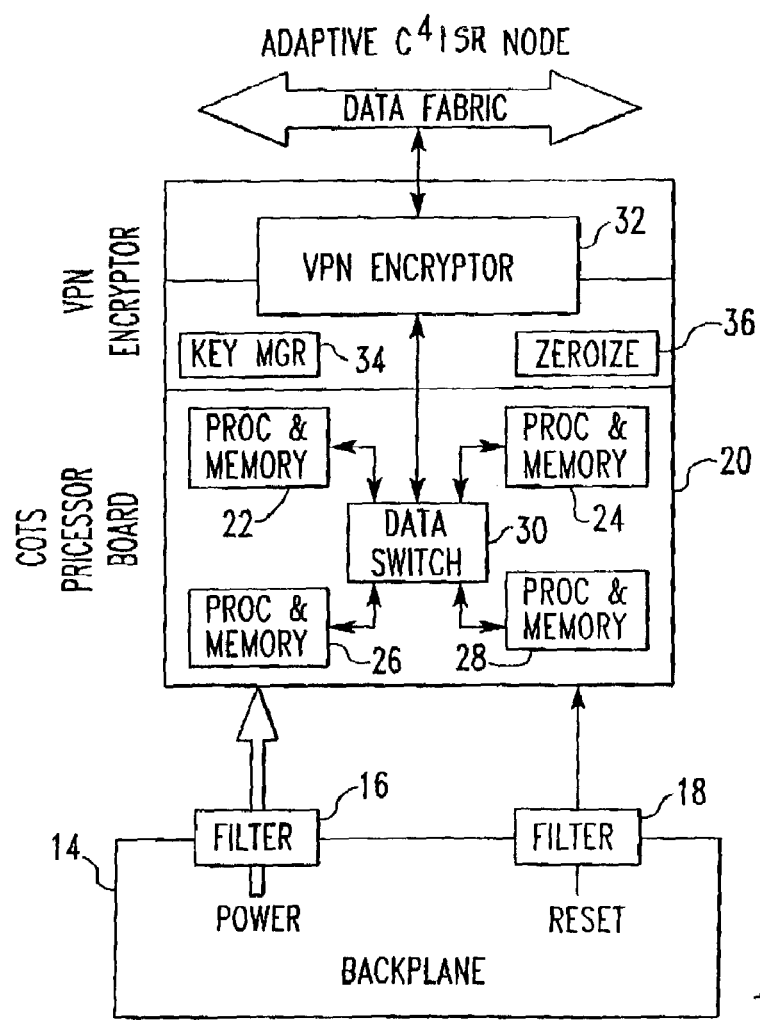

Referring to FIG. 1a, there is a COTS processor board 10 on which is affixed the VPN encryptor 12, which is a PMC daughter card that makes use of an approved INFOSEC chip. This daughter card is designed to support red/black separation and is not a COTS product. The processor board runs on the red side. The backplane 14 isolates power and simple controls and forms another red/black boundary using techniques such as filters 16 18.

The COTS processor board 20 typically includes processors and memories 22, 24, 26, and 28 which are interconnected with a data switch 30. The data switch 30 is interconnected with a VPN encryptor 32 which has a key manager function 34 and a zeroised function 36 which are explained in greater detail hereafter.

Figure 2:
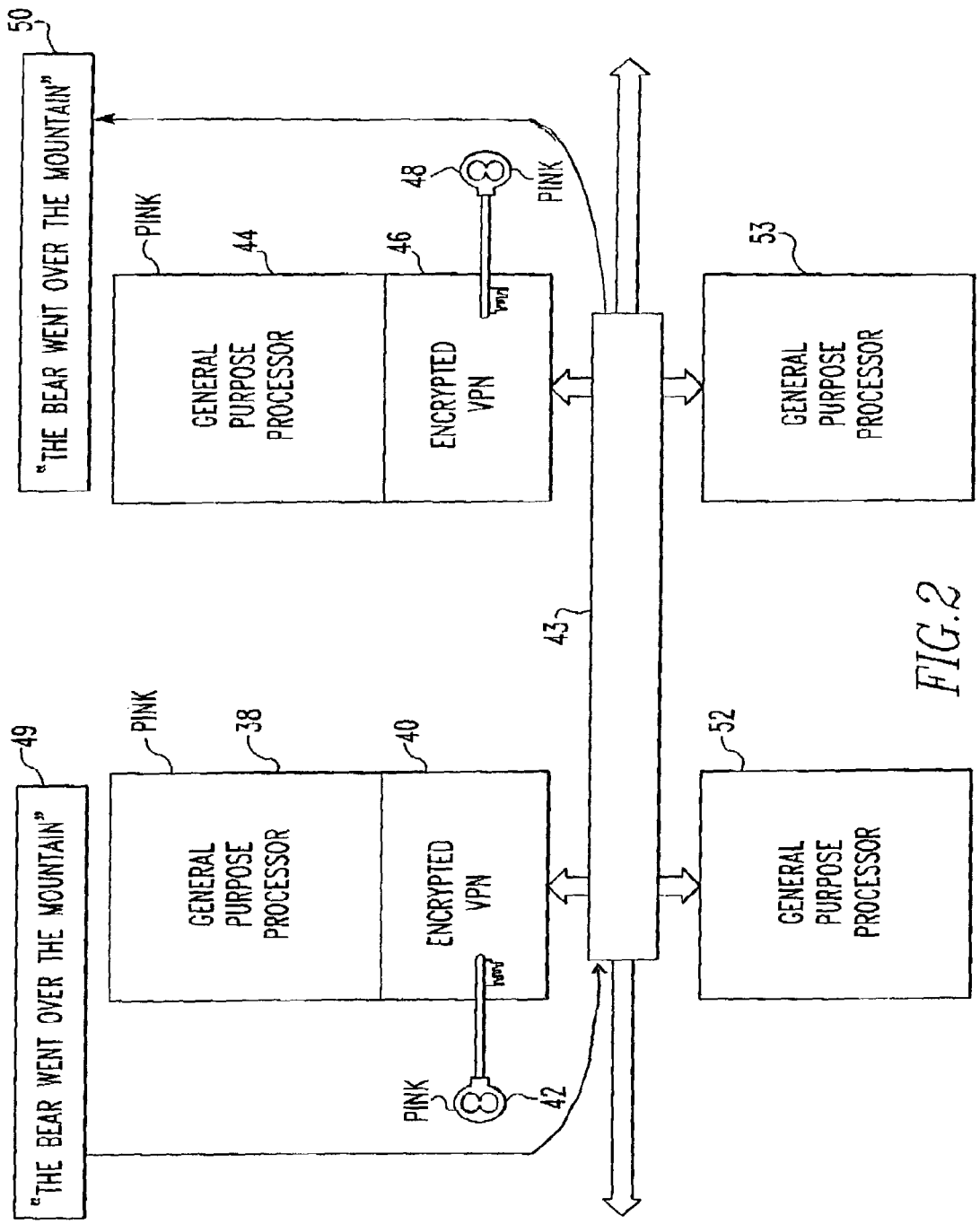
FIG. 2 is a schematic diagram showing a method by which encrypted VPN supports red/black separation on a single data fabric as is used in a preferred embodiment of the method of the present invention.

Referring to FIG. 2, there is a COTS general purpose processor board (GPP) 38 with an encrypted VPN 40 having a key 42 which is interconnected by way of a bus 43 to a second general purpose processor 44 with an encrypted VPN having a key 48. This key 48 is the same as key 40; therefore, data 49 contained in general purpose processor 38 is encrypted by the VPN card 40, transferred over the data fabric of bus 43, is decrypted by the VPN card 46 and received by general purpose processor 44. The information 49 exchanged between GPP 38 and GPP 44 (and received at GPP 44 as information 50) cannot be intercepted by unclassified GPP 52 or GPP 53 because the data is encrypted as it is transferred over the data fabric or bus 43.

Figure 3:
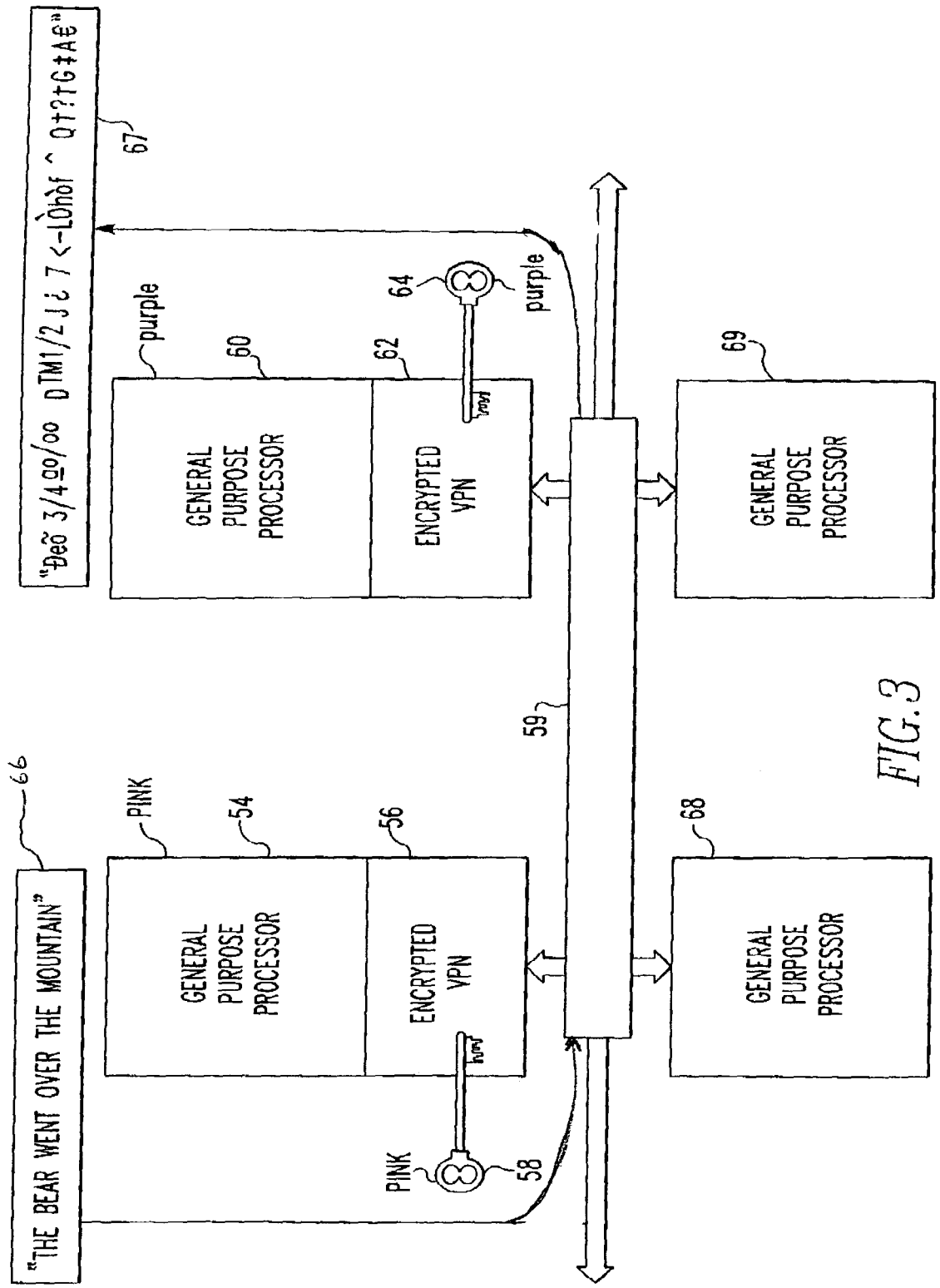
FIG. 3 is a schematic diagram showing encrypted VPN support of multi-level security as is used in a preferred embodiment of the method of the present invention.

Referring to FIG. 3, GPP 54 with an encrypted VPN 56 and key 58 is shown. This GPP is interconnected through bus 59 to a general purpose processor 60 with an encrypted VPN 62 and key 64. Key 64 is different from key 58; therefore, data or message 66 in general purpose processor 54 is not encrypted as data message 67 in GPP 60.

Still referring to FIG. 3, there are two VPN cards 56 and 62 on GPP's 54 and 60 respectively which are keyed for two different classification levels, e.g. CONFIDENTIAL designated pink and SECRET designated purple and there is a message 66 which gets encrypted and gets put on the bus 59, and is sent to the GPP 60 via the VPN 62. This board tries to decrypt the message 66 with the wrong key, so that garbled information is received so it does not get the final message. All the information that goes across the data fabric is unclassified information which is either purely unclassified or classified information that has been encrypted and so unclassified GPPs 68 and 69, cannot access any classified information. Accordingly, computers at the SECRET level can talk to each other. Computers at the TOP SECRET level can talk to each other. Computers at the unclassified level can talk to each other. Computers of different classification cannot directly communicate. If, for example, a SECRET computer tries to talk to a CONFIDENTIAL computer the information cannot go through. The only way the user can do that is to go through a government certified device that allows that type of information flow which is called the guard function. The guard function examines the content of messages, rate of messages, and other message parameters and determined, by a series of pre-defined security policies, whether the information should be permitted to cross between classification levels. So each type of GPP has a key at its own classification level and so if it is desired to change these from, for example, from TOP SECRET to SECRET, first the trusted software of this implementation deletes the keys and that makes the two boards unclassified. The key management function of this implementation then provides new keys. For example, if the user wants to change to the CONFIDENTIAL level he can have four boards that can run at the CONFIDENTIAL level. The user can also use the same boards to process unclassified information by zero zing the key. Now the user can run the GPP at the bypass mode and can run unclassified information on it.

Figure 4:
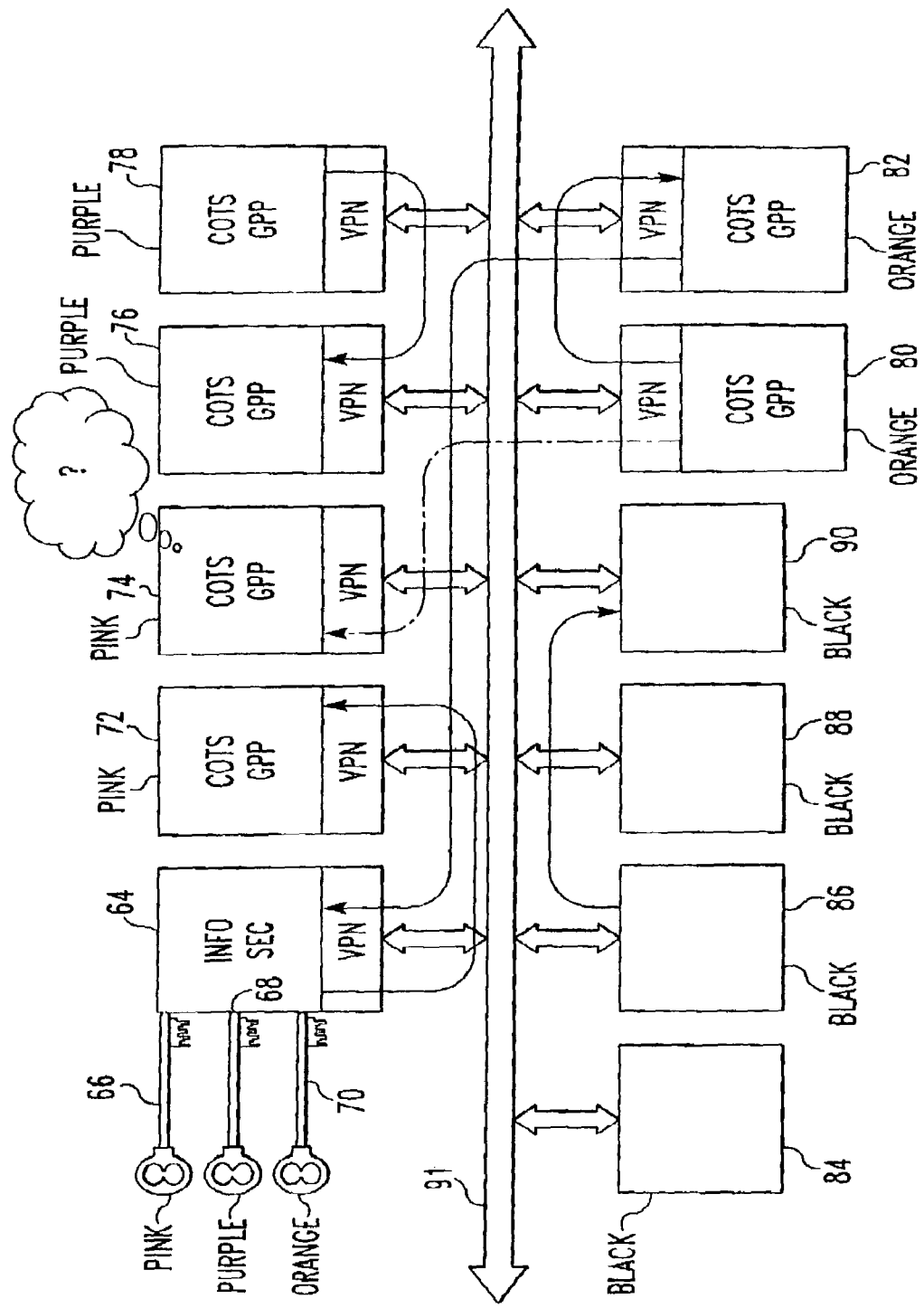
FIG. 4 is a schematic diagram illustrating a method by which the Information Security (INFOSEC) module controls intra-level communications and key management as is used in a preferred embodiment of the method of the present invention.

Referring to FIG. 4, there is an INFOSEC module with a VPN card 64 with keys 66, 68, and 70. There are also COTS general-purpose processors (GPP) with VPN cards 72, 74, 76, 78, 80, and 82. There are also unclassified GPP=s 84, 86, 88, and 90. In this arrangement the INFOSEC module 64 controls intra-level communications and key management. It is understood from the previous discussions that information can be passed over the data fabric or bus 91 between like classification levels, but not between different classification levels. It will be understood from FIG. 4 that information can be transferred between different classification levels only by passing the information through the trusted guard function on the INFOSEC module. It can be passed between the unclassified GPP's 84, 86, 88 and 90. The information can also be passed directly between the boards at one classification level 80, 82 which are the same classification level. The information can be passed between boards at a different classification level 76 and 78 and all of these information transfers can occur at the same time. If a board at one classification level at GPP 80 attempts to send information to another GPP allocated to a different classification level at GPP 74 that information cannot be passed as was described in connection with FIG. 3. Instead, that information must got through an information security module which contains the keys for all classification levels and includes a trusted guard function which implements the security policies for sending information between different classification levels. If COTS GPP 82 has information that needs to be sent to COTS GPP 72 which is operating at a different classification level it is first sent to the INFOSEC module. The data is encrypted by the VPN at GPP 82, goes across the data fabric, is decrypted by the VPN with the orange key. That information and then checked by the trusted guard function. If it meets the security policies, it is re-encrypted with the pink GPP 72 and the information is then sent over the data fabric encrypted with that key, decrypted by the VPN on processor 72 and the information then can be received.

Figure 5:
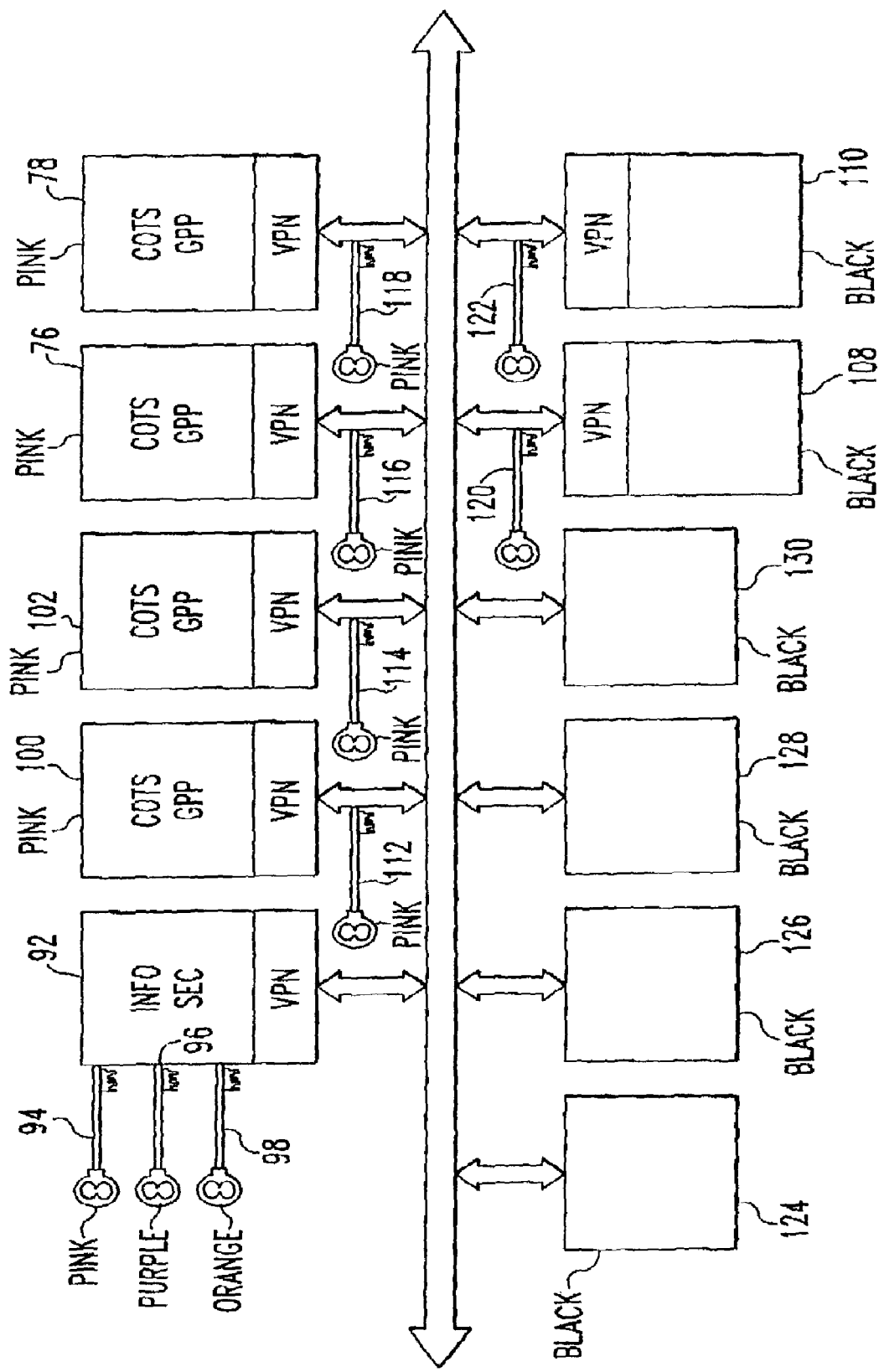
FIG. 5 is a schematic diagram illustrating encrypted VPN permitting dynamic allocation of assets to different security levels as is used in a preferred embodiment of the method of the present invention.

Referring to FIG. 5, there is an INFOSEC module with VPN card 92 with keys 94, 96, and 98. There are also COTS GPP's with VPN cards 100, 102, 104, 106, 108, and 110 which have respectively keys 112, 114, 116, 118, 120, and 122. There are also unclassified GPP=s 124, 126, 128, and 130. In this arrangement the encrypted VPN permits dynamic allocation of assets to different security levels. It will be understood from FIG. 5 that the classification level of processors can be changed by the trusted software by deleting the key in the VPM module, zeroizing the COTS processor, which means wiping out any information in the memory, and reloading it with a different key. In this way the COTS processor can dynamically change from one classification level to another without the need to effect any physical changes to the system.

Figure 6:
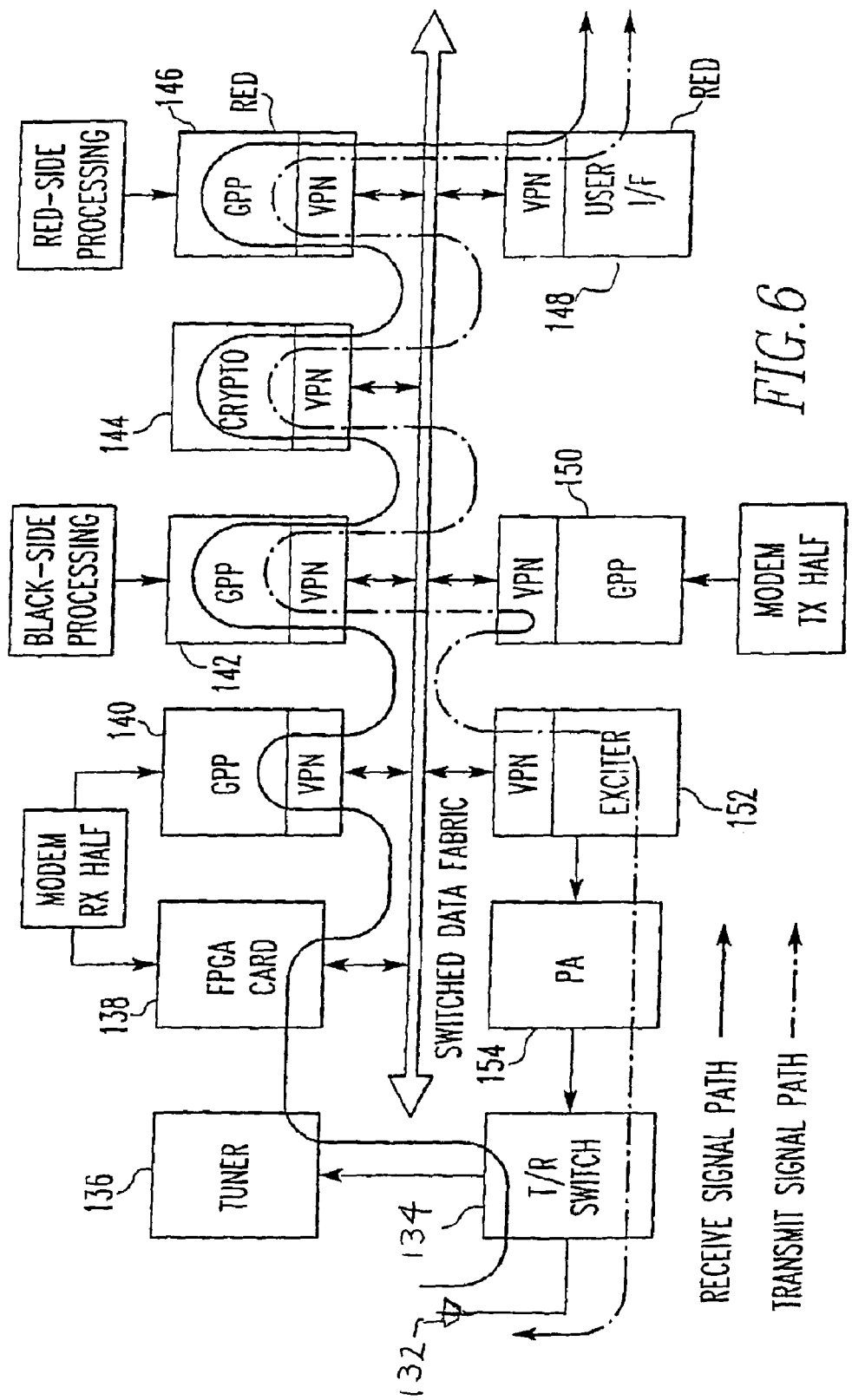
FIG. 6 is a schematic diagram illustrating the implementing of a communications path with reconfigurable assets as is used in a preferred embodiment of the method of the present invention.

Referring to FIG. 6, an arrangement is shown with an antenna 132, a T/R switch 134, a tuner 136, an FPGA card 138, GPP's with VPN cards 140 and 142, which in this instance are set to perform unclassified processing, government authorized cryptographic equipment 144 implemented on the INFOSEC modules discussed earlier, and red side processing GPP with VPN card 146. There is also a user interface (I/F) with VPN card 148 as well as another GPP with VPN card 150, an exciter with VPN card 152, a PA 154, a T/R switch 156 and an antenna 158. It will be understood from FIG. 6 and FIG. 7 generally, that one possible application of the invention in which the user has a multi-mission system which is to be capable of simultaneously performing communications, signal intelligence (SIGINT) and jamming. Conventionally these three capabilities are implemented by three totally separate systems and the security approach used today would prohibit those functions from being implemented simultaneously in the same system. It will be understood that the method and apparatus of this invention can allow information to be separated and allows the two functions to occur simultaneously. The solid line shows the receive communications path from the antenna 158 being received by the tuner 136 implementing a modem in the FPGA card 138 in the black side general purpose processor 140. Additional black side processing occurring on the general purpose processor 142. Information then goes to the crypto device 144 which may be the IFOSEC module 144 described in connection with FIG. 6. The information then gets the key change as described on FIG. 4 and is sent to the classified processing on the general purpose processor 146 is then sent out to the user to receive the data through the user interface 148. The information to be transmitted from the user out the radio communication functions is received by the user interface 148 as SECRET level data and is sent over to a GPP the same classification level where the red side processing of the radio occurs. It is then sent over the data fabric to the crypto logical device located on the information security module 144 where the data is encrypted for transmission. From where it goes to the transmit black side processing at GPP 142 it then goes to a GPP 150 also on the black side where the transmit half of the modem is prepared, over the VPN in this case in the bypass mode because data is being transferred from a black processor to a black processor, out to the exciter 152 and the information is sent through the power amplifier 154 out to the transmit receive (TR) switch 156 and transmitted out the antenna 158. In this way, the user can implement a secure radio using the invention as a reconfigurable software programmable radio.

Figure 7:
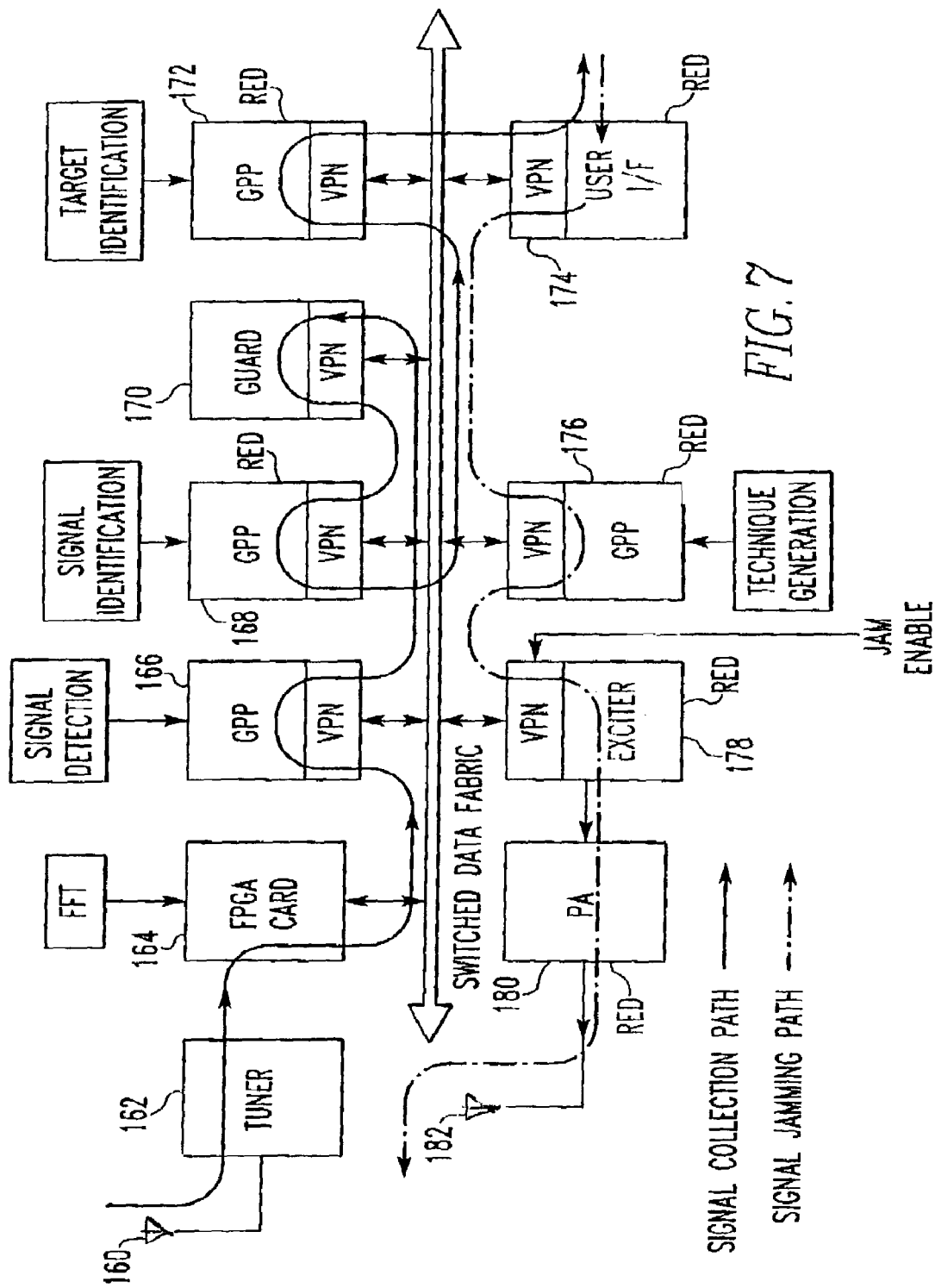
FIG. 7 is a schematic diagram illustrating the implementing of a jammer with reconfigurable assets as is used in a preferred embodiment of the method of the present invention.

Referring to FIG. 7, an arrangement is shown in which there is an antenna 160, a tuner 162, an FPGA card 164, a GPP with VPN card 166 for signal detection, a GPP with VPN card 168 for signal identification, a guard with VPN card 170, and a GPP with VPN card 172. There is also a User I/F with VPN card 174, GPP with VPN card 176, an exciter with VPN card 178, a PA 180 and an antenna 182. It will be understood from FIG. 7 that it is shown that the same hardware configuration used for communications in FIG. 6 can be used simultaneously for signals intelligence (SIGINT) simultaneously with communications signal jamming. For SIGINT the target signal is received by the antenna 160 and processed by the tuner 162 and then sent to the FPGA card 164 which implements a fast transform FFT. That information is then passed over the switch data fabric to the general purpose processor 166 which implements the signal detection function. The information is then passed to provide some additional classified processing. In order to accomplish this processing the information is sent to the guard function on the INFOSEC module 170 where it allows information to be passed in an unrestricted way from the unclassified side of the system to the classified side of the system but has a means to insure that no information can accidentally be leaked back in the other direction. The information is then encrypted with the classified level key on the VPN card mounted on the INFOSEC module 170 and sent over to the general purpose processor 168 which is running at the classified level. The processor then does a signal identification. That information is further processed and sent to another computer operating at the same classification level 172 that performs additional processing such as target identification. That information then is reported to the user, operating at the classified level and so it is sent across the VPN across the user interface and out to the user. In this way the user can get the SIGINT information that was processed by the system.

Using the same hardware and running at the same time, communication signal jamming may be accomplished. A command comes from the user to perform the jamming through the user interface 174 this is a classified level command that is then sent over the VPN to the general-purpose processor 176. That information is then sent to the exciter 178 where the RF signal is generated and it is sent to the power amplifier 180 and out the antenna 182.

It will be appreciated that a method and apparatus for operating a multi-level security system has been described which efficiently makes use of all available computer assets. It will also be appreciated that this method and apparatus can make use of off the shelf or other computers, which may be available through commercial sources.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A multi-level security apparatus for processing a plurality of different classification levels of information, the apparatus comprising:

a plurality of processors configured to collectively process information simultaneously at a classified level of information and an unclassified level of information;

a data interconnection configured to interconnect the plurality of processors;

a first card having a first key connected to the data interconnection and to a first processor of the plurality of processors, wherein the first processor is configured to communicate with the data interconnection through the first card;

a second card having a second key connected to the data interconnection and to a second processor of the plurality of processors, wherein the second processor is configured to communicate with the data interconnection through the second card;

a processing module configured to be in communication with the first card and the second card through the data interconnection for reallocating said first and second processors from processing said unclassified level of information to said classified level of information, the processing module comprising an information security module with a guard function configured to allow information to be passed in an unrestricted way from an unclassified side of the apparatus to a classified side of the apparatus.

2. The apparatus of claim 1 wherein each of said first and second data cards comprises a daughter card.

3. The apparatus of claim 1 wherein the processing module is configured to dynamically reallocate security levels of said first and second processors.

4. The apparatus of claim 1 wherein the plurality of different classification levels comprises TOP SECRET, SECRET, and CONFIDENTIAL.

5. The apparatus of claim 1 wherein the first card comprises a first virtual private network (VPN) card and the second comprises a second VPN card.

6. The apparatus of claim 1 wherein the data interconnection comprises a data fabric included in a bus.

7. The apparatus of claim 6 wherein the first and second keys are the same, the first card configured to encrypt data contained in the first processor creating encrypted data for transmission over the data fabric of the bus for receipt and decryption by the second card and receipt by the second processor, the encrypted data not readable by a general processor of the plurality of processors.

8. The apparatus of claim 6 wherein the first and second cards are keyed for a higher and a lower classification level, whereby when data from the first processor is encrypted and put on the bus, garbled information is received at the second processor.

9. The apparatus of claim 8 wherein information that goes across the data fabric is either unclassified information or classified information that has been encrypted.

10. The apparatus of claim 8 wherein the first and second keys are keyed for a plurality of different classification levels.

11. The apparatus of claim 1 further comprising an information security module which is keyed for a plurality of different classification levels.

12. The apparatus of claim 1 wherein the first card and the second card are keyed for at least one of a classified information or for a classification level.

13. The apparatus of claim 1 further comprising a tuner and an FPGA card configured to simultaneously perform communication, signal intelligence (SIGINT), and jamming functions.

14. A method for securely transmitting information comprising:
setting a first key corresponding to a first classification level for a first card operatively connected between a bus and a first processing device;
setting a second key corresponding to a second classification level for a second card operatively connected between the bus and a second processing device;
receiving first information encrypted at the first classification level and second information encrypted at the second classification level at the bus simultaneously;
receiving the first information at an information security module in communication with the bus;
determining that the first information is intended for the second processing device;
decrypting the first information at the information security module to create decrypted first information;
encrypting the decrypted first information corresponding to the second classification level to create second encrypted first information;
receiving and decrypting the second encrypted first information at the second card.

15. The method of claim 14 further comprising:
storing a plurality of keys at an information security module in communication with the bus;
deleting the second key from the second card;
loading a key from the plurality of keys stored at the information security module at the second card.

16. The method of claim 14 further comprising:
sending a jamming signal from a transmitter in communication with the bus;
receiving encrypted information at a receiver in communication with the bus.

17. A multi-level security apparatus for processing a plurality of different classification levels of information, the apparatus comprising:
a plurality of processors;
a bus connected for communication among the plurality of processors;
a first card having a first key connected to the bus and to a first processor of the plurality of processors, wherein the first processor is configured to communicate with the bus through the first card;
a second card having a second key connected to the bus and to a second processor of the plurality of processors, wherein the second processor is configured to communicate with the bus through the second card;
an information security module with a guard function configured to allow information to be passed in an unrestricted way from an unclassified side of the apparatus to a classified side of the apparatus;
wherein the apparatus is configured to receive first information encrypted at a first classification level and second information encrypted at a second classification level at the bus simultaneously;
wherein the plurality of processors are configured to collectively process information simultaneously at the first classification classified level, the second classification level, and at an unclassified level of information.

18. The apparatus of claim 17 further comprising a processing module connected for communication with the bus, wherein the processing module is configured to dynamically reallocate security levels of the first and second processors.

19. The apparatus of claim 17 further comprising an information security module keyed for a plurality of different classification levels.

20. The apparatus of claim 17 further comprising a tuner and an FPGA card configured to simultaneously perform communication, signal intelligence (SIGINT), and jamming functions.

* * * * *

UNITED STATES PATENT AND TRADEMARK OFFICE
CERTIFICATE OF CORRECTION

| | | |
|---|---|---|
| PATENT NO. | : 7,958,351 B2 | Page 1 of 1 |
| APPLICATION NO. | : 10/334318 | |
| DATED | : June 7, 2011 | |
| INVENTOR(S) | : Luthi | |

It is certified that error appears in the above-identified patent and that said Letters Patent is hereby corrected as shown below:

Column 7, line 13, in Claim 5, delete "second" and insert -- second card --.

Signed and Sealed this
Eighteenth Day of October, 2011

David J. Kappos
*Director of the United States Patent and Trademark Office*